US008401170B2

(12) United States Patent
Mohan

(10) Patent No.: US 8,401,170 B2
(45) Date of Patent: Mar. 19, 2013

(54) METHOD OF USING VOIP FOR CALLBACK FROM AN ACD

(75) Inventor: Prabhuram Mohan, San Jose, CA (US)

(73) Assignee: Aspect Software, Inc., Chelmsford, MA (US)

( * ) Notice: Subject to any disclaimer, the term of this patent is extended or adjusted under 35 U.S.C. 154(b) by 1631 days.

(21) Appl. No.: 11/497,891

(22) Filed: Aug. 2, 2006

(65) Prior Publication Data

US 2008/0043981 A1 Feb. 21, 2008

(51) Int. Cl.
*H04M 3/00* (2006.01)

(52) U.S. Cl. .............................. 379/265.02; 379/265.01

(58) Field of Classification Search ............. 379/265.01, 379/265.02, 266.01, 309
See application file for complete search history.

(56) References Cited

U.S. PATENT DOCUMENTS 5,555,179 A 9/1996 Koyama et al.
5,765,033 A 6/1998 Miloslavsky
5,926,539 A 7/1999 Shtivelman
5,946,387 A 8/1999 Miloslavsky
5,953,332 A 9/1999 Miloslavsky
5,953,405 A 9/1999 Miloslavsky
6,002,760 A 12/1999 Gisby
6,021,428 A 2/2000 Miloslavsky
6,044,145 A 3/2000 Kelly et al.
6,044,368 A 3/2000 Powers
6,067,357 A 5/2000 Kishinsky et al.
6,108,711 A 8/2000 Beck et al.
6,138,139 A 10/2000 Beck et al.
6,167,395 A 12/2000 Beck et al.
6,170,011 B1 1/2001 Beck et al.
6,175,563 B1 1/2001 Miloslavsky
6,175,564 B1 1/2001 Miloslavsky et al.
6,185,292 B1 2/2001 Miloslavsky
6,345,305 B1 2/2002 Beck et al.
6,373,836 B1 4/2002 Deryugin et al.
6,381,645 B1 4/2002 Sassin
6,389,007 B1 5/2002 Shenkman et al.
6,393,015 B1 5/2002 Shtivelman
6,732,156 B2 5/2004 Miloslavsky
7,043,009 B1 * 5/2006 Fischer et al. ........... 379/265.09
2002/0026435 A1 * 2/2002 Wyss et al. ........................ 707/1
2004/0196856 A1 10/2004 Bondarenko et al.
2006/0023695 A1 * 2/2006 Yarlagadda et al. .......... 370/352
2006/0256949 A1 * 11/2006 Noble, Jr. ................. 379/265.01
2007/0198368 A1 * 8/2007 Kannan et al. ................. 705/26

FOREIGN PATENT DOCUMENTS

WO WO03071773 8/2003
WO WO 2004/023324 3/2004

OTHER PUBLICATIONS

EP Search Report—Application No. 07252187.5-2414.

* cited by examiner

*Primary Examiner* — William Deane, Jr.
(74) *Attorney, Agent, or Firm* — Husch Blackwell LLP

(57) ABSTRACT

A method and apparatus are provided for establishing a communication connection between a client of an organization and an agent of the organization. The method includes the steps of an automatic call distributor of the organization receiving a call from the client, the automatic call distributor detecting an IM handle of the client from the call and the automatic call distributor establishing a VOIP connection between the client and agent of the organization using the IM handle.

34 Claims, 1 Drawing Sheet

14 INTERNET
HOST 44 WS 46 CF 48 CR 52 AP 50 IMP 54 56 58 ASP 64 CBP 66 EMP 16
29 31 24 26 28 30
12 PSTN
ACD 32 CPU 60 AA VR TR 63 62 34 SWITCH 18
20 36 40 38 42 22 10

100

WOULD YOU LIKE AN AGENT TO CONTACT YOU? 102

YOUR NAME: 104

IM HANDLE:

IF YOU WOULD LIKE US TO CALL YOU AT A SPECIFIC TIME, THEN PLEASE ENTER A TIME. OTHERWISE WE WILL CALL YOU AS SOON AS POSSIBLE. 106

DATE: 108

TIME:

SUBMIT 110

METHOD OF USING VOIP FOR CALLBACK FROM AN ACD

FIELD OF THE INVENTION

The Field of the invention relates to communication systems and more particularly to contact centers.

BACKGROUND OF THE INVENTION

Contact centers are generally known. Contact centers are typically used whenever an organization is required to handle large numbers of contacts with clients of the organization.

In order to handle the contacts, the organization may provide a corresponding number of agents conversant in the details of the organization. The organization may distribute the contacts to its agents using an automatic contact distributor.

Contacts with clients may be initiated through any of a number of different mediums. For example, a client may initiate a call through the public switched telephone network (PSTN) to the automatic contact distributor. Alternatively, the client may initiate a call to the organization in the form of an e-mail or instant message.

In addition, many organizations also provide websites to advance the interests of the organization. In addition to providing information about the organization, the website may also provide one or more contact windows that automatically connect a website visitor to an agent of the organization.

In general, contacts may be initiated by a client based upon some concern of the client or may be initiated by the organization in an effort to advance the agenda of the organization. Once delivered to the automatic contact distributor, contacts may be distributed to agents based upon any of a number of different criteria (e.g., longest available, highest skill, etc.).

While contact centers work well, occasionally there are not enough agents to handle the influx of calls. In this case, a client may receive a pre-recorded message instructing the client to leave his/her name and number so that agent may call back at a later time.

While this process is effective, it incurs additional expense for the organization. Accordingly, a need exists for less expensive ways of handling call backs.

SUMMARY

A method and apparatus are provided for establishing a communication connection between a client of an organization and an agent of the organization. The method includes the steps of an automatic call distributor of the organization receiving a call from the client, the automatic call distributor detecting an IM handle of the client from the call and the automatic call distributor establishing a VOIP connection between the client and agent of the organization using the IM handle.

DETAILED DESCRIPTION OF AN ILLUSTRATED EMBODIMENT

Figures 1, 2:
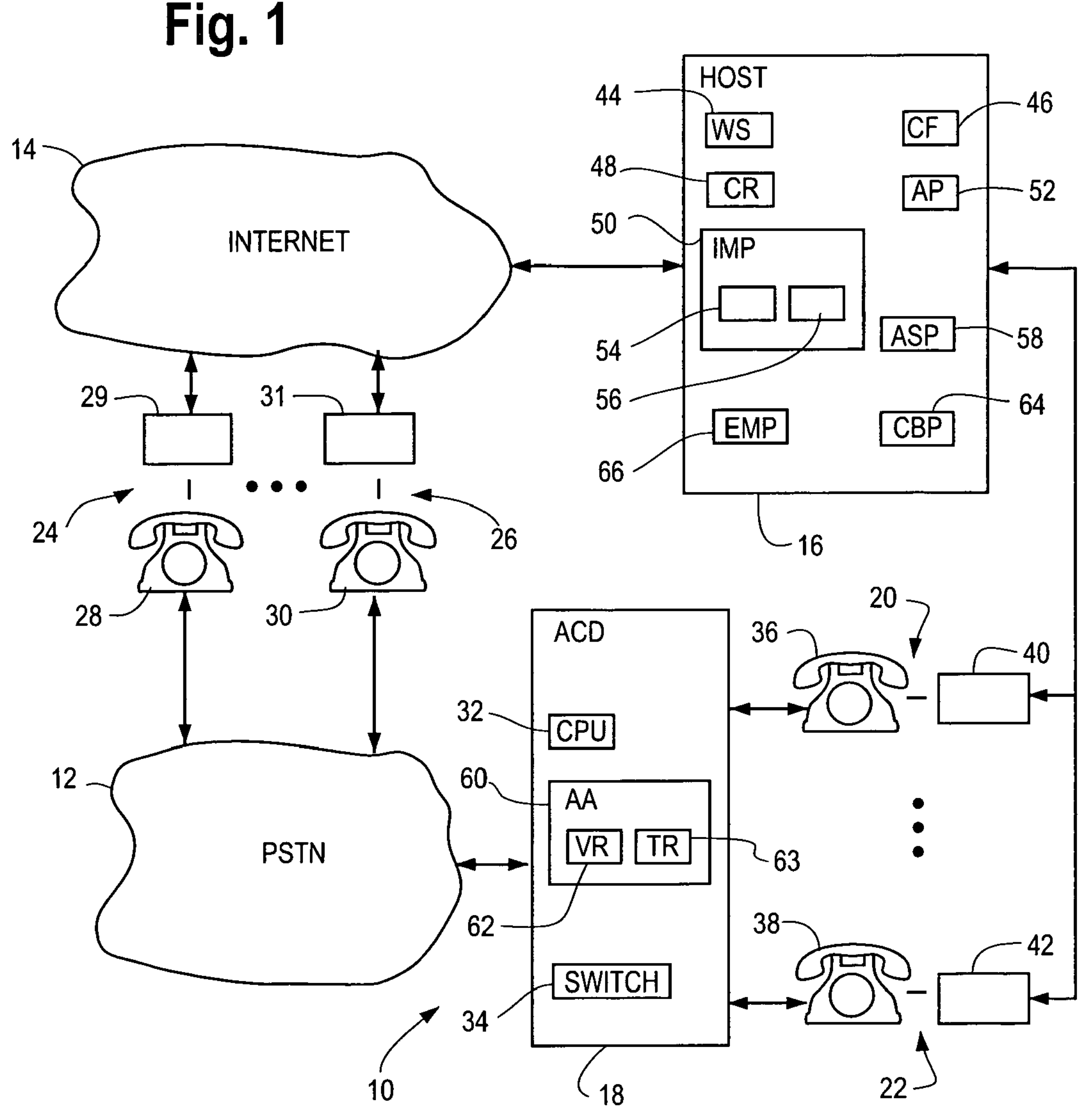
FIG. 1 is a block diagram of a contact distribution system shown generally in accordance with an illustrated embodiment of the invention.
FIG. 2 depicts a screen that may be used by the system of FIG. 1.

FIG. 1 is a block diagram of a system 10 that may be used by an organization to handle contacts with clients of the organization shown generally under an illustrated embodiment of the invention. The system 10 may include a host 16 and an automatic call distributor (ACD) 18.

The ACD 18 may be used to place and receive client calls under a switched circuit format. For example, clients 24, 26 may place calls to the organization through the PSTN 12 using a respective telephone 28, 30 of the client 24, 26. Alternatively, the organization may purchase lists of telephone numbers of potential clients and place outbound calls to potential clients. In the case of outbound calls, a central processing unit (CPU) 32 within the ACD 18 may transfer telephone numbers to the PSTN 12 requesting telephone connections with clients 24, 26.

In either case, once a call is detected, the CPU 32 of the ACD 18 may collect call associated information (e.g., DNIS, ANI, etc.) and transfer the call associated information to the host 16. The host 16, in turn, may open a call file 46 for purposes of tracking the call.

The ACD 18 may distribute the calls to an agent at an agent station 20, 22 (hereinafter "agent 20, 22"). Selection of an agent 20, 22 to handle a call may be based upon any of a number of different criteria (e.g., idle time, skill etc.).

Once an agent 20, 22 has been selected for a call, the CPU 32 may send instructions to a switch 18 to connect the call to the selected agent 20, 22. Once connected with the selected agent, 20, 22, the client 24, 26 and agent 20, 22 may converse and resolve any concerns of the client.

In order to enhance agent efficiency, the system 10 may determine an identity of the client 24, 26 and display client records on a terminal 40, 42 of the selected agent 20, 22 at the same instant as the contact is delivered to the agent 20, 22. In order to determine an identity of the client 24, 26, the system 10 may receive and analyze call associated information. For example, for calls through the PSTN 12, ANI information may be delivered along with the call. From the ANI information, the system 10 may search a customer records database 48 to identify the client 24, 26 and display any records associated with the client on a terminal 40, 42 of the agent 20, 22 at the same instant that the call is delivered to the agent 20, 22.

Similarly, the organization may also maintain a website 44 within the host 16. Clients 24, 26 may access the website 44 through the Internet 14 to download web pages from the website 44.

At least some of the web pages downloaded from the website 44 may include a CONVERSE WITH AGENT softkey. Upon activation of the CONVERSE WITH AGENT softkey, the host 16 may connect the client 24, 26 with an agent 20, 22 under an appropriate communication format (e.g., chat, e-mail, VOIP, etc.).

The host 16 may also identify the client 24, 26 and display client information on a terminal 40, 42 of an agent 20, 22 in a manner similar to that described above. In this case, the host 16 may retrieve a URL of the client 24, 26 from the website 44 and search the customer records 48. Any records located within the database 48 may be displayed on the terminal 40, 42 of the agent 20, 22 at the same instant that the call is delivered to the agent 20, 22.

In some cases, the system 10 may become overloaded and not have any agents 20, 22 available to handle incoming calls. Alternatively, calls may arrive outside of the normal working hours of the organization. In these situations, the system 10 will attempt to schedule a return call. In the case where the client 24, 26 activates the CONVERSE WITH AGENT softkey, the host 16 may download a callback webpage 100 (FIG. 2) to the client 24, 26.

Within the callback webpage 100, the client 24, 26 may be provided with a first interactive box 102 where the client 24,

26 may enter his name. A second interactive box 104 is provided in which the client 24, 26 may enter his/her instant message (IM) handle (e.g., "John@aol.com"). A third interactive box 106 and fourth interactive box 108 may be provided where the client 24, 26 may enter a date and time for a callback from an agent 20, 22.

The client may enter his name in the first box 102 and his IM handle in the second box 104. The client 24, 26 may optionally enter a desired time for a return call, if he/she so chooses.

Upon entering information in the appropriate boxes 102, 104, 106, 108, the client 24, 26 may activate a SUBMIT softkey 110. Upon activating the SUBMIT softkey 110, the callback webpage 100 is transferred from the terminal 29, 31 of the client 24, 26 to the host 16.

Within the host 16, a callback (call) processor 64 receives the information entered through the webpage 100 as a new call, opens a call file 46 and enters information collected from the transaction (i.e., the webpage 100). In this regard, the call back processor 64 enters the name and IM handle of the client 24, 26 into the call file 46. If the client 24, 26, has entered a requested time for a call, that time and date are also entered. The call back processor 64 may also retrieve a URL of the client 24, 26 for purposes of identifying the client 24, 26 and a web page from which the call originated.

In the simplest case (e.g., where the client 24, 26 has not entered a time for the call), an agent availability processor 52 may immediately initiate a call to the client 24, 26 or may monitor agent availability to determine the best time to place the return call. The agent availability processor 52 may determine agent availability using any of a number of different methods (e.g., agent idle time, call queue time, etc.).

Upon determining that sufficient agent availability exists to ensure that an agent 20, 22 will be available when the call is set up, the agent availability processor 52 may transfer the file 46 to an IM processor 50. Within the IM processor 50, the IM handle is retrieved and used as a target address to initiate a VOIP call to the client 24, 26. In this request, the IM processor 50 composes a VOIP connection request for transfer to the terminal 29, 31 of the client 24, 26. The composed VOIP connection request is sent to the Internet address identified by the IM handle of the client 24, 26.

The VOIP connection request is received by the terminal 29, 31 of the client 24, 26 and is displayed for acceptance or rejection by the client 24, 26. If the client 24, 26, accepts, then the terminal 29, 31 sends a VOIP set up message back to the IM processor 50.

The IM processor 50 receives the VOIP set up message and analyzes the message to determine a VOIP protocol (e.g., AOL, YAHOO, GOOGLE, SKYPE, etc.). Once the VOIP protocol is identified, the IM processor 50 activates a corresponding VOIP application 54, 56 to complete set up of the VOIP voice channel between the client 24, 26 and IM processor 50.

Once the VOIP channel has been set up, the IM processor 50 may transfer a copy of the call file 46 to an agent selection processor 58. Within the agent selection processor 58, the call associated information may be used to determine a probable purpose of the call.

In this regard, the web page from which the call originated may be used as a first indicator of the subject matter of the call. The name, URL and/or IM handle may also be used as search terms to search client records 48. If the name, URL and/or IM handle can be matched with a prior record of the client 24, 26, then any prior interaction with the client 24, 26 may be used as an indication of the purpose of a current call.

Once a probable purpose of the call is determined, then the agent selection processor 58 may select an agent to handle the call. Selection of an agent 20, 22 may be performed by matching a probable purpose of the call against a list of agent skills within an agent skill list located within the host 16.

Once an agent is selected, the agent selection processor 58 may transfer an identifier of the selected agent 20, 22 to the IM processor 50. The IM processor 50, in turn, may function to set up a two-way voice connection between the IM processor 50 and selected agent 20, 22. The IM processor 50 may remain in the connection relaying voice information between the selected agent 20, 22 and client 24, 26. Alternatively, the IM processor 50 may transfer the URL of the client 24, 26 to the selected agent 20, 22 and allow a corresponding VOIP application within a terminal 40, 42 of the selected agent 20, 22 to re-establish the VOIP voice connection.

In the event that the client 24, 26 provides a callback time within windows 106, 108, then the IM processor 50 may delay initiating the callback until the appointed time. In this case, the IM processor 50 may periodically compare a current date and time with the appointed time. When the IM processor 50 detects a match, then the IM processor 50 proceeds to place the call as described above.

In another embodiment, the IM processor 50 may attempt to detect an on-line presence of the client 24, 26 before placing the VOIP call. In this scenario, the IM processor 24, 26 may constantly scan a presence indicator (e.g., in AOL, the presence indicator is a buddies list) to detect the on-line presence of the client 24, 26. When the IM processor 50 detects the presence of the client 24, 26, the IM processor 50 places the call as described above.

Under another embodiment of the invention, a call may be received by the ACD 18 through the PSTN 12. If an agent 20, 22 is not available, then the calling client 24, 26 may be placed in a call queue. After a predetermined time period, the caller may be connected to an autoattendant processor (autoattendant) 60.

The autoattendant 60 may offer the client 24, 26 the option of receiving a return call from an agent 20, 22. In this case, the calling client 20, 22 may be asked to recite his/her name, an IM handle and, optionally, a time for a return call. A voice recognition processor 62 may detect the recited information and transfer the detected information to the call back processor 64 as a new call. The call back processor 64 may receive the detected information and open a new call file 46. The call back processor 64 may return the call using VOIP as discussed above.

Alternatively, the client 24, 26 may enter his name and IM handle using the touch-tone keys on his telephone. In this case, a tone recognition processor 63 may detect and collect the name, IM handle and, possibly, the date and time of the return call. In this case, non-standard symbols such as the "@" character may be entered via use of various combinations of the "*" and "#" keys. The detected information may be transferred to the call back processor 64 and the return call may proceed as discussed above.

In another embodiment, the web page 100 may be structured as an e-mail. In this case, the e-mail may be forwarded to an e-mail processor 66 where the name of the client 24, 26 and IM handle may be identified via a search routine and transferred to the call back processor 64 as a new call.

Alternatively, the return of the information collected by window 100 of FIG. 2 may be returned in the form of an e-mail. Once the client 24, 26 has filled out the appropriate boxes 102, 104, 106, 108, the client 24, 26 may activate a SUBMIT softkey. Once the SUBMIT key is activated, the IM handle is e-mailed to the IM processor 50 where the callback information is recovered and the VOIP call proceeds as discussed above.

A specific embodiment of method and apparatus for establishing communication connections has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of establishing a communication connection between a client of an organization and an agent of the organization comprising:

an automatic contact distributor of the organization receiving a callback request from the client through a callback webpage of the organization;

the automatic contact distributor detecting an Instant Message (IM) handle of the client entered by the client with the callback request via the callback webpage ; and the automatic contact distributor establishing a VOIP connection between the client and agent of the organization in response to the callback request using the IM handle.

2. The method of establishing the communication connection as in claim 1 further comprising transmitting a VOIP connection request from the automatic contact distributor to a client internet address identified by the IM handle.

3. The method of establishing the communication connection as in claim 1 further comprising the client providing a requested time for the communication connection, and determining a VoIP protocol by analyzing a set-up message sent from the client in response to the connection request.

4. The method of establishing the communication connection as in claim 1 further comprising detecting an on-line presence of the client using the IM handle before attempting to establish the VoIP connection.

5. The method of establishing the communication connection as in claim 1 wherein the step of detecting the IM handle further comprises downloading a web page to the client with an interactive window requesting the IM handle.

6. The method of establishing the communication connection as in claim 5 further comprising the client providing the IM handle through the interactive window of the downloaded web page.

7. The method of establishing the communication connection as in claim 1 further comprising the automatic call distributor receiving an e-mail from the client that includes the IM handle, and searching the e-mail to identify the IM handle.

8. The method of establishing the communication connection as in claim 1 wherein the step of receiving the call further comprises determining that the received call is a switched circuit voice call from the client.

9. The method of establishing the communication connection as in claim 8 wherein the step of receiving the voice call from the client further comprises placing the call in a call queue.

10. The method of establishing the communication connection as in claim 9 wherein the step of placing the call in a call queue further comprises connecting the voice call to an autoattendandant after a predetermined time period.

11. The method of establishing the communication connection as in claim 9 wherein the step of connecting the voice call to an autoattendant further comprises prompting the client to provide the IM handle by voice entry using voice recognition to detect the IM handle from the voice entry.

12. The method of establishing the communication connection as in claim 11 further comprising the autoattendant detecting a requested time of the communication connection.

13. An apparatus for establishing a communication connection between a client of an organization and an agent of the organization comprising:

means within an automatic contact distributor of the organization for receiving a callback request from the client through a callback webpage of the organization;

means within the automatic call distributor for detecting an Instant Message (IM) handle of the client entered by the client with the callback request via the callback webpage; and means within the automatic call distributor for establishing a VOIP connection between the client and agent of the organization in response to the callback request using the IM handle.

14. The apparatus for establishing the communication connection as in claim 13 further comprising means for transmitting a VOIP connection request from the automatic call distributor to the client.

15. The apparatus for establishing the communication connection as in claim 13 further comprising means used by the client for providing a requested time for the communication connection and means of determining a VoIP protocol by analyzing a set-up message sent from the client.

16. The apparatus for establishing the communication connection as in claim 13 further comprising means for detecting an on-line presence of the client using the IM handle before attempting to establish the VoIP connection.

17. The apparatus for establishing the communication connection as in claim 13 wherein the means for detecting the IM handle further comprises means for downloading a webpage to the client with an interactive window requesting the IM handle.

18. The apparatus for establishing the communication connection as in claim 17 further comprising means used by the client for providing the IM handle through the interactive window.

19. The apparatus for establishing the communication connection as in claim 13 further comprising means within the automatic call distributor for receiving an e-mail from the client that includes the IM handle.

20. The apparatus for establishing the communication connection as in claim 13 wherein the means for receiving the call further comprises means for determining that the received call is a switched circuit voice call from the client.

21. The apparatus for establishing the communication connection as in claim 20 wherein the means for receiving the voice call from the client further comprises means for placing the call in a call queue.

22. The apparatus for establishing the communication connection as in claim 21 wherein the means for placing the call in a call queue further comprises means for connecting the voice call to an autoattendandant after a predetermined time period.

23. The apparatus for establishing the communication connection as in claim 21 wherein the means for connecting the voice call to an autoattendant further comprises means for prompting the client to provide the IM handle by voice entry and a voice recognition processor to detect the IM handle from the voice entry.

24. The apparatus for establishing the communication connection as in claim 23 further comprising means within the autoattendant for detecting a requested time of the communication connection.

25. An apparatus for establishing a communication connection between a client of an organization and an agent of the organization comprising:

a call processor within an automatic contact distributor of the organization that receives a callback request from the client through a callback webpage of the organization;

an IM handle received from the client by the call processor and provided by the client via the callback webpage; and an instant message processor within the automatic call distributor for establishing a VOIP connection between the client and agent of the organization in response to the callback request using the IM handle.

26. The apparatus for establishing the communication connection as in claim 25 further comprising a VOIP connection request transferred from the automatic call distributor to the client.

27. The apparatus for establishing the communication connection as in claim 25 further comprising a web page used by the client for providing a requested time for the communication connection and the call processor determining a VoIP protocol for the VoIP connection by analyzing a set-up message from the client.

28. The apparatus for establishing the communication connection as in claim 25 further comprising a buddies list for detecting an on-line presence of the client using the IM handle.

29. The apparatus for establishing the communication connection as in claim 25 further comprising a webpage downloaded to the client with an interactive window that requests the IM handle.

30. The apparatus for establishing the communication connection as in claim 25 wherein the received call further comprises a switched circuit voice call from the client.

31. The apparatus for establishing the communication connection as in claim 30 further comprising a call queue that receives the switched circuit call.

32. The apparatus for establishing the communication connection as in claim 31 wherein the call queue further comprises an autoattendandant that is connected to the call after a predetermined time period.

33. The apparatus for establishing the communication connection as in claim 32 wherein the autoattendant further comprises asking the client to provide the IM handle by voice entry and a voice recognition processor to detect the IM handle from the voice entry.

34. The apparatus for establishing the communication connection as in claim 33 further comprising the autoattendant detecting a requested time of the communication connection.

* * * * *